(12) United States Patent  
Lukens

(10) Patent No.: US 7,707,871 B2  
(45) Date of Patent: May 4, 2010

(54) LEAK DETECTION SYSTEM WITH CONTROLLED DIFFERENTIAL PRESSURE

(75) Inventor: Peter C. Lukens, Tucson, AZ (US)

(73) Assignee: Raytheon Company, Waltham, MA (US)

( * ) Notice: Subject to any disclaimer, the term of this patent is extended or adjusted under 35 U.S.C. 154(b) by 234 days.

(21) Appl. No.: 11/903,762

(22) Filed: Sep. 24, 2007

(65) Prior Publication Data

US 2009/0173144 A1 Jul. 9, 2009

(51) Int. Cl.
*G01M 3/04* (2006.01)
(52) U.S. Cl. ........................ 73/49.2; 73/40.7
(58) Field of Classification Search ................. 73/40.7, 73/49.2, 49.3
See application file for complete search history.

(56) References Cited

U.S. PATENT DOCUMENTS

| | | | | |
|---|---|---|---|---|
| 4,055,984 | A * | 11/1977 | Marx ........................ | 73/40.7 |
| 4,328,700 | A | 5/1982 | Fries | |
| 4,542,643 | A * | 9/1985 | Himmelstein ............... | 73/49.2 |
| 4,686,851 | A * | 8/1987 | Holm et al. ................. | 73/49.2 |
| 4,754,638 | A | 7/1988 | Brayman et al. | |
| 4,791,805 | A | 12/1988 | Gates | |
| 5,029,464 | A * | 7/1991 | Lehmann .................... | 73/49.3 |
| 5,170,660 | A * | 12/1992 | Lehmann .................... | 73/49.3 |
| 5,499,529 | A | 3/1996 | Kronberg et al. | |
| 5,831,147 | A * | 11/1998 | Hoath ........................ | 73/49.3 |
| 5,915,270 | A * | 6/1999 | Lehmann .................... | 73/49.2 |
| 6,196,056 | B1 | 3/2001 | Ewing et al. | |
| 6,354,142 | B1 * | 3/2002 | Nothhelfer et al. .......... | 73/49.3 |
| 6,393,897 | B1 * | 5/2002 | Arnold et al. ............... | 73/40.7 |
| 7,062,954 | B2 | 6/2006 | Vittozzi et al. | |
| 7,156,976 | B2 | 1/2007 | Bley | |
| 2001/0037672 | A1 * | 11/2001 | Lehmann .................... | 73/49.2 |
| 2006/0156795 | A1 | 7/2006 | Perkins et al. | |
| 2006/0226347 | A1 | 10/2006 | Leitch et al. | |

* cited by examiner

*Primary Examiner*—John Fitzgerald
(74) *Attorney, Agent, or Firm*—John J. Horn, Esq.

(57) ABSTRACT

A system for detecting leaks in a unit. The novel system includes a first mechanism for injecting a first gas into an interior or an exterior of the unit, a second mechanism for sampling gas from an exterior or an interior of the unit to determine if the first gas has leaked out of or into the unit, respectively, and a third mechanism for controlling a differential pressure between the interior and exterior of the unit during sampling. In an illustrative embodiment, the differential pressure is controlled by injecting a second gas into the exterior or interior of the unit to replace the sampled gas, and using pressure regulators to control the pressures of the first and second gases such that the differential pressure remains constant during sampling.

34 Claims, 2 Drawing Sheets

LEAK DETECTION SYSTEM WITH CONTROLLED DIFFERENTIAL PRESSURE

BACKGROUND OF THE INVENTION

1. Field of the Invention

The present invention relates to systems and methods for detecting gaseous leaks. More specifically, the present invention relates to systems and methods for detecting gas leaks using a mass spectrometer.

2. Description of the Related Art

Some missile systems fully enclose the projectile in a hermetically sealed storage tube in order to physically protect the missile and limit permeation of water into the container. In some systems, the storage tube also serves as a launch tube for the missile. If water should migrate into the missile, it could seriously damage the system (for instance, through corrosion, condensation on the electronics or optics, etc.). During the manufacturing process, the storage/launch tube is therefore hermetically sealed and must be leak checked to ensure that it is sealed to the level required by the system.

The most common method of leak detection involves injecting a tracer gas such as helium around the unit under test and using a mass spectrometer to detect if any of the tracer gas has leaked into the unit. This type of leak detection is very accurate, sensitive, and can quantitatively measure the leak rate of the unit. A mass spectrometer, however, typically requires creating a vacuum in the unit.

Certain missile storage/launch tubes cannot be subject to the 1 atm differential pressure encountered with vacuum leak detection equipment. This is because the storage/launch tube includes end caps that are designed to burst when exposed to pressure or are weakly attached to the tube body (so that the missile can exit the tube during launch). Creating a vacuum inside the tube (or in a test chamber containing the tube) in order to perform a mass spectrometer leak detection test would cause the end caps to burst. This limitation on the differential pressure that can be applied to the tube limits the kinds of leak detection that can be used.

Currently, missile storage/launch tubes are typically leak checked using a pressure decay method. This method involves increasing the pressure inside the tube by a very small amount (typically, about 5 psi) and then measuring the pressure after a certain amount of time has passed (typically, about 45 minutes). If the pressure has decayed by more than a specified amount, then the tube is considered to have an unacceptably high leak rate.

The pressure decay test, however, is relatively insensitive, inaccurate, and slow when compared to mass spectrometer leak detection. Since the test depends on the measured change in pressure, it is very sensitive to temperature changes. Even a fraction of a degree of change in the ambient temperature can cause a false indication of a leak, or worse, mask a real leak. In order to help control the temperature, the missile storage/launch tube is typically placed in a test chamber and allowed to sit for 2 hours in order to come to thermal equilibrium. The pressure decay test is then applied, which takes another 45 minutes. The entire procedure therefore takes about 2 hours and 45 minutes, an excessively long amount of time that can be very expensive (due to labor and equipment costs). The pressure decay test is also very imprecise, since the pressure change being measured is a very small amount. The tube cannot be pumped to higher pressure levels to increase precision because the tubes cannot be subject to larger amounts of pressure, as discussed above.

Hence, a need exists in the art for an improved system or method for detecting leaks in systems that are sensitive to differential pressure that is more accurate and less time consuming than prior approaches.

SUMMARY OF THE INVENTION

The need in the art is addressed by the system and method for detecting leaks in a unit of the present invention. The novel system includes a first mechanism for injecting a first gas into an interior or an exterior of the unit, a second mechanism for sampling gas from an exterior or an interior of the unit to determine if the first gas has leaked out of or into the unit, respectively, and a third mechanism for controlling a differential pressure between the interior and exterior of the unit during sampling. In an illustrative embodiment, the differential pressure is controlled by injecting a second gas into the exterior or interior of the unit to replace the sampled gas, and using pressure regulators to control the pressures of the first and second gases such that the differential pressure remains constant during sampling.

In a first illustrative embodiment, the first gas is injected into a test chamber containing the unit and a mass spectrometer samples gas from the interior of the unit. The second gas is injected into the interior of the unit to replace the sampled gas and a first pressure regulator controls the pressure of the second gas such that the pressure in the interior of the unit remains constant. A second pressure regulator controls the pressure of the first gas to control the pressure in the test chamber.

In an alternate embodiment, the first gas is injected into the interior of the unit and the mass spectrometer samples gas from the test chamber surrounding the unit under test. The second gas is injected into the test chamber to replace the sampled gas and a first pressure regulator controls the pressure of the second gas such that the pressure in the test chamber remains constant. A second pressure regulator controls the pressure of the first gas to control the pressure in the interior of the unit.

DESCRIPTION OF THE INVENTION

Illustrative embodiments and exemplary applications will now be described with reference to the accompanying drawings to disclose the advantageous teachings of the present invention.

While the present invention is described herein with reference to illustrative embodiments for particular applications, it should be understood that the invention is not limited thereto. Those having ordinary skill in the art and access to the teachings provided herein will recognize additional modifications, applications, and embodiments within the scope thereof and additional fields in which the present invention would be of significant utility.

The present invention teaches a system and method for detecting leaks that utilizes a mass spectrometer, which has high sensitivity, accuracy, and a short test duration, as described above. However, in contrast to conventional mass spectrometer based leak detectors, the present invention does not subject the unit under test (UUT) to differential pressures which could damage a missile storage/launch tube.

The novel leak detection system of the present invention uses helium tracer gas and a mass spectrometer for detection. The UUT is placed inside a closed test chamber which is flushed with helium to displace the atmosphere and immerse the UUT in helium at a regulated pressure. Gas from inside the UUT is withdrawn through a sampling tube and analyzed by a mass spectrometer. A regulated nitrogen gas source is also connected to the UUT to replace the gas withdrawn from inside the UUT by the sampling tube. As gas is withdrawn from the UUT and the internal pressure of the UUT tends to decrease, the regulated nitrogen line injects gas so that the internal pressure of the UUT remains constant.

Thus, because the helium pressure outside the UUT is controlled and the gas pressure inside the UUT is controlled, the differential pressure—and forces—experienced by the UUT are controlled. If the UUT has leaks, the helium atmosphere surrounding it will diffuse into the UUT and intermix with the air inside the UUT. This gas is sampled by the mass spectrometer and the leak will be detected and quantified.

Figure 1:
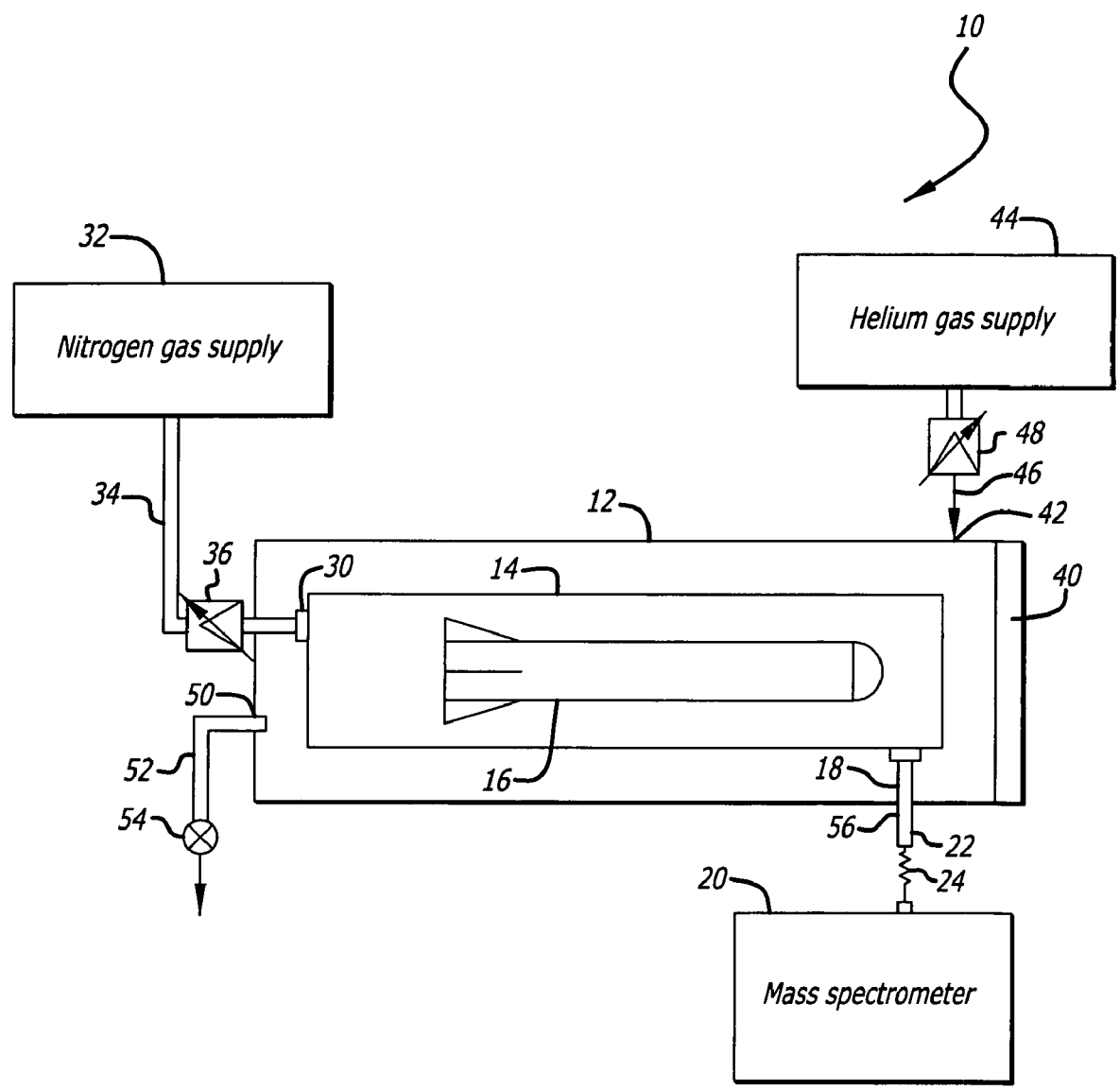
FIG. 1 is a simplified schematic of a leak detection system designed in accordance with an illustrative embodiment of the present teachings.

FIG. 1 is a simplified schematic of a leak detection system 10 designed in accordance with an illustrative embodiment of the present teachings. The system 10 includes a sealed test chamber 12 that holds the UUT 14 to be tested. In the illustrative embodiment, the UUT 14 is a storage/launch tube for a missile 16. The leak detection system 10 may also be adapted to detect leaks in other types of objects without departing from the scope of the present teachings.

The UUT 14 includes a test port 18 that is coupled to a mass spectrometer 20 by a sampling line 22. In accordance with the present teachings, the UUT 14 is not pumped down to a vacuum (a vacuum is typically required when using a mass spectrometer). A flow impedance 24 is added between the mass spectrometer 20 and the test port 18 for controlling the rate at which gas flows into the mass spectrometer 20 through the sampling line 22. In the illustrative embodiment, the sampling line 22 is connected to the test port 18 on one end and to the flow impedance 24 on the other end. The flow impedance 24, which may be in the form of capillary tubing, restricts the flow of gas withdrawn from inside the UUT 14 to a level the mass spectrometer 20 can handle (allowing the mass spectrometer 20 to sample gas at a higher pressure than vacuum). The mass spectrometer 20 is tuned to detect the tracer gas (helium, in the illustrative embodiment).

In accordance with the present teachings, the UUT 14 also includes a second port 30 that is coupled to a nitrogen gas supply 32 by a nitrogen supply line 34. A pressure regulator 36 is coupled between the nitrogen gas supply 32 and the nitrogen port 30 for regulating the pressure of the nitrogen gas that is supplied to the UUT 14. The nitrogen gas is injected into the UUT 14 to replace gas withdrawn by the sampling line 22 such that the internal pressure of the UUT 14 remains constant. In the illustrative embodiment, nitrogen gas is used as the replacement gas because it is commonly available, inexpensive, and easily distinguished from the tracer gas (helium, in the illustrative embodiment) by the mass spectrometer 20. Other gases (any gas other than the tracer gas) may also be used as the replacement gas without departing from the scope of the present teachings.

In the illustrative embodiment of FIG. 1, the two ports 18 and 30 are shown at opposite ends of the UUT 14. However, the ports 18 and 30 do not need to be at opposite ends; they can be located at anywhere on the UUT 14.

The test chamber 12 is a hermetically sealed container that is filled with the tracer gas. The test chamber 12 may be, for example, an aluminum tube with a hermetically sealed door 40 for allowing the UUT 14 to be placed within the test chamber 12. Other implementations may also be used without departing from the scope of the present teachings.

The test chamber 12 includes an inlet port 42 that is coupled to a helium gas supply 44 by a helium supply line 46. A helium pressure regulator 48 is coupled between the helium gas supply 44 and the helium port 42 for regulating the pressure of the helium gas that is supplied to the test chamber 12. In accordance with the present teachings, the helium regulator 48 and the nitrogen regulator 36 are set such that the differential pressure experienced by the UUT 14 is controlled (limited to less than a ten psia, for example, in the illustrative missile application). If the UUT 14 has any leaks, the helium gas—which acts as the tracer gas—will leak into the UUT 14 and be detected by the mass spectrometer 20. In the illustrative embodiment, helium gas is used as the tracer gas because it is very light and can pass through small leaks very quickly, and it is also easily distinguishable by the mass spectrometer 20 from other gases present in the atmosphere. Other gases may also be used as the tracer gas without departing from the scope of the present teachings.

The test chamber 12 also includes an exhaust port 50 that is coupled to an exhaust line 52, which is controlled by an exhaust valve 54. The exhaust line 52 may be vented into the room or vented into an air handling system or exhaust hood to remove any tracer gas from the test environment. It may be preferable to have the inlet port 42 and exhaust port 50 located at opposite ends of the test chamber 12 in order to help flush out the air and replace it with the helium. The test chamber 12 may also include an opening 56 for allowing the sampling line 22 to pass through the test chamber 12 to the mass spectrometer 20, which is located outside of the test chamber 12 in the illustrative embodiment.

In operation, the UUT 14 is sealed within the test chamber 12 and the test chamber 12 is filled with helium at a regulated pressure through the helium inlet regulator 42. Air is flushed out of the test chamber 12 through the exhaust line 52 until the concentration of helium in the test chamber 12 approaches 100%. The exhaust valve 54 is then closed so the helium pressure inside the test chamber 12 can rise to a prescribed level.

The UUT 14 is therefore surrounded by helium. If there are any leaks in the UUT 14, the helium will leak into the UUT 14 and be sampled by the mass spectrometer 20. The mass spectrometer 20 has a vacuum pump that pulls gas out of the UUT 14 through the sampling line 22 and flow impedance 24. The flow impedance 24 is chosen such that the gas flow out of the UUT 14 is greater than the largest leak rate to be tested (dependant on the application). This ensures that the concentration of helium gas inside the UUT 14 due to a leak comes to equilibrium quickly and does not increase with time. That is, the sampling tube flow rate is chosen such that it removes gas much faster than helium gas leaks into the UUT 14. The excess flow of gas out of the UUT 14 through the sampling line 22 is replaced by nitrogen from the low pressure nitrogen regulator 36. This ensures that the differential pressure from inside-to-outside the UUT 14 remains controlled.

In an illustrative embodiment, the nitrogen regulator 36 and the helium regulator 48 are both set to atmospheric pressure and the differential pressure is therefore kept near zero. Alternatively, both may be set at a low pressure, or a high pressure. The nitrogen regulator 36 and the helium regulator 48 may also be set to different pressures, to control the differential pressure to be at a specified level.

The mass spectrometer 20 detects the amount of helium in the gas sampled from the sampling line 22 and measures the total leak rate of the UUT 14.

The illustrative embodiment of FIG. 1 is an outside-in system that surrounds the outside of the UUT 14 with tracer gas and samples the gas inside the UUT 14 for detection by the mass spectrometer 20. The novel leak detection system of the present invention may also be configured as an inside-out detector, in which the tracer gas is injected inside the UUT 14 and gas from outside the UUT 14 is sampled and detected by the mass spectrometer 20.

Figure 2:
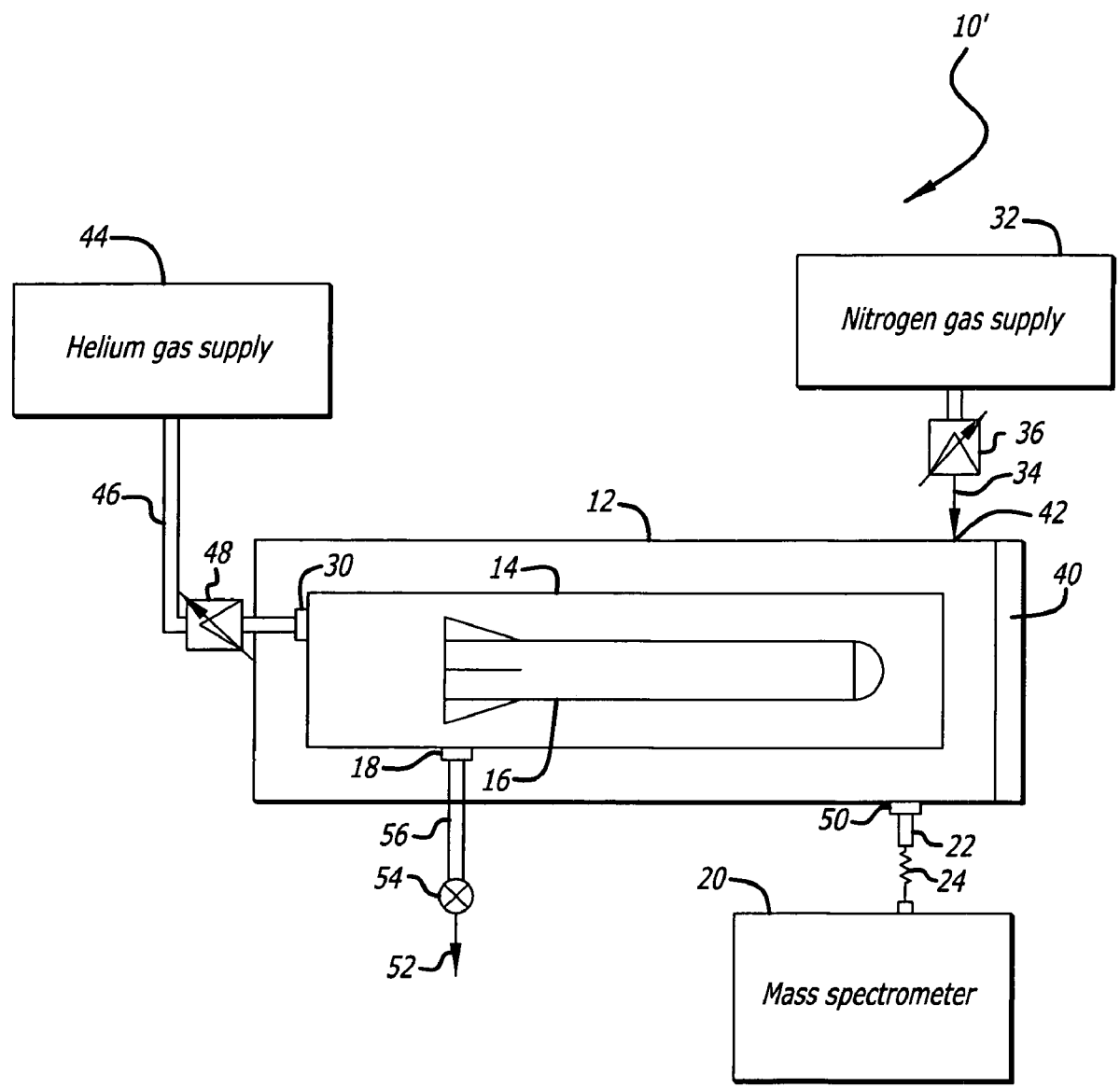
FIG. 2 is a simplified schematic of an inside-out leak detection system designed in accordance with an alternate embodiment of the present teachings.

FIG. 2 is a simplified schematic of an inside-out leak detection system 10' designed in accordance with an illustrative embodiment of the present teachings. This embodiment is similar to the embodiment of FIG. 1, except the tracer gas (helium) is injected into the UUT 14, and gas from the test chamber 12 is sampled by the mass spectrometer 20 (and the nitrogen gas is injected into the test chamber 12 to replace the sampled gas).

In the embodiment of FIG. 2, the two ports 18 and 30 of the UUT 14 are coupled to the exhaust line 52 and the helium gas supply 44, respectively. A helium pressure regulator 48 is coupled between the helium gas supply 44 and the UUT 14 for regulating the pressure of the helium gas that is supplied to the UUT 14. An exhaust valve 54 is coupled to the exhaust line 52.

The two ports 42 and 50 of the test chamber 12 are coupled to the nitrogen gas supply 32 and the mass spectrometer 20, respectively. A sampling line 22 is connected to the test port 50 on one end and to a flow impedance 24 on the other end. The flow impedance 24 is coupled to the mass spectrometer 20. A nitrogen pressure regulator 36 is coupled between the nitrogen gas supply 32 and the nitrogen port 42 for regulating the pressure of the nitrogen gas that is supplied to the test chamber 12. The test chamber 12 may also include an opening 56 for allowing the exhaust line 52 to pass from the UUT 14 to outside of the test chamber 12.

In operation, the UUT 14 is filled with helium at regulated pressure through the helium inlet regulator 42. Air is flushed out of the UUT 14 through the exhaust line 52 until the concentration of helium in the UUT 14 approaches 100%. The exhaust valve 54 is then closed so the helium pressure inside the UUT 14 can rise to a prescribed level. If there are any leaks in the UUT 14, the helium will leak out of the UUT 14 into the test chamber 12 and be sampled by the mass spectrometer 20. The flow impedance 24 is chosen such that the gas flow out of the test chamber 12 is greater than the largest leak rate to be tested. This ensures that the concentration of helium gas inside the test chamber 12 due to a leak comes to equilibrium quickly. That is, the sampling tube flow rate is chosen such that it removes gas much faster than helium gas leaks into the test chamber 12 from the UUT 14. The excess flow of gas out of the test chamber 12 through the sampling line 22 is replaced by nitrogen from the low pressure nitrogen regulator 36. This ensures that the differential pressure from inside-to-outside the UUT 14 remains controlled. The mass spectrometer 20 detects the amount of helium in the gas sampled from the sampling line 22 and measures the total leak rate of the UUT 14.

In the illustrative embodiments of FIGS. 1 and 2, the differential pressure is controlled by adding replacement nitrogen gas as gas is withdrawn by the mass spectrometer so that the pressure in the UUT (FIG. 1) or test chamber (FIG. 2) remains constant. The differential pressure could also be controlled by controlling the helium supply, removing helium gas from the test chamber (FIG. 1) or UUT (FIG. 2) at the same rate as the rate at which gas is withdrawn by the mass spectrometer, so that the internal and external pressures are reduced together and the differential pressure remains constant. However, controlling a pump to remove the helium at a rate that will produce an equal pressure drop may be difficult to implement.

The differential pressure is more easily controlled using the embodiments of FIGS. 1 and 2, in which simple pressure regulators are used to control the gas inside and outside of the UUT. It does not matter if the mass spectrometer pulls gas through the sampling line quickly or slowly, or at a variable rate; the nitrogen regulator will automatically inject nitrogen such that the pressure is maintained at the desired level.

Thus, by replacing the gas withdrawn by the mass spectrometer with a replacement gas such as nitrogen, the novel leak detection system of the present invention can accurately measure the leak rate of the UUT without subjecting either the interior or the exterior of the UUT to a hard vacuum. The differential pressure experienced by the UUT can be controlled by controlling the pressures of the tracer gas and the replacement gas. Because the UUT is enveloped in helium, the total leak rate of the UUT is measured (as opposed to the leak rate from a localized area of the UUT). The system does not evacuate the test chamber or the UUT, so there is no delay while large volumes are pumped out. The detection of leaks using the present teachings can be considerably faster and more accurate than the conventional pressure decay method currently employed or "sniffing" which does not quantify the total leak rate.

The system may be calibrated by replacing the UUT with a test device having a known leak rate. This test device can be in the form of the UUT, a so-called "golden unit", or could have a different geometry to facilitate easy handling, installation and removal. By utilizing a test unit with a known leak rate, the entire system can be calibrated and UUTs compared against a known, and possibly certified, leak standard.

Thus, the present invention has been described herein with reference to a particular embodiment for a particular application. Those having ordinary skill in the art and access to the present teachings will recognize additional modifications, applications and embodiments within the scope thereof. For example, the present teachings have been described above with reference to a system for detecting leaks in missile storage/launch tubes. The invention, however, may also be applied to other applications, such as leak detection in vacuum equipment, plumbing systems, medical devices, food processing systems, etc., without departing from the scope of the present teachings.

It is therefore intended by the appended claims to cover any and all such applications, modifications and embodiments within the scope of the present invention.

Accordingly,

What is claimed is:

1. A system for detecting leaks in a unit comprising:
   first means for injecting a first gas into an interior or an exterior of said unit;
   second means for sampling gas from an exterior or an interior of said unit to determine if said first gas has leaked out of or into said unit, respectively; and
   third means for maintaining a constant differential pressure between said interior and exterior of said unit during said sampling.

2. The invention of claim 1 wherein said first gas is helium.

3. The invention of claim 1 wherein said second means includes a mass spectrometer.

4. The invention of claim 3 wherein said second means further includes means for controlling a rate at which sampled gas flows into said mass spectrometer.

5. The invention of claim 4 wherein said second means further includes a flow impedance coupled to an input of said mass spectrometer.

6. The invention of claim 1 wherein said third means includes means for replacing gas that has been sampled with a second gas.

7. The invention of claim 6 wherein said second gas is nitrogen.

8. The invention of claim 6 wherein said third means further includes means for regulating a pressure of said second gas.

9. The invention of claim 8 wherein said third means further includes means for regulating a pressure of said first gas.

10. The invention of claim 6 wherein said system includes a test chamber for containing said unit.

11. The invention of claim 10 wherein said first means includes means for injecting said first gas into said test chamber.

12. The invention of claim 11 wherein said second means includes means for sampling gas from said interior of said unit.

13. The invention of claim 12 wherein said third means includes means for injecting said second gas into said interior of said unit to replace said sampled gas.

14. The invention of claim 13 wherein said third means includes means for regulating a pressure of said second gas such that pressure in said interior remains constant.

15. The invention of claim 14 wherein said third means includes a first pressure regulator coupled between said unit and a supply of said second gas.

16. The invention of claim 15 wherein said third means further includes means for regulating a pressure of said first gas to control a pressure in said test chamber.

17. The invention of claim 16 wherein said third means includes a second pressure regulator coupled between said test chamber and a supply of said first gas.

18. The invention of claim 17 wherein said system further includes means for removing air in said test chamber in order to fill said test chamber with said first gas.

19. The invention of claim 10 wherein said first means includes means for injecting said first gas into said interior of said unit.

20. The invention of claim 19 wherein said second means includes means for sampling gas from said test chamber.

21. The invention of claim 20 wherein said third means includes means for injecting said second gas into said test chamber to replace said sampled gas.

22. The invention of claim 21 wherein said third means includes means for regulating a pressure of said second gas such that pressure in said test chamber remains constant.

23. The invention of claim 22 wherein said third means includes a first pressure regulator coupled between said test chamber and a supply of said second gas.

24. The invention of claim 23 wherein said third means further includes means for regulating a pressure of said first gas to control a pressure in said interior of said unit.

25. The invention of claim 24 wherein said third means includes a second pressure regulator coupled between said unit and a supply of said first gas.

26. The invention of claim 25 wherein said system further includes means for removing air in said interior of said unit in order to fill said interior with said first gas.

27. A system for detecting leaks in a unit comprising:
a test chamber within which said unit is contained;
a supply of a first gas coupled to a port in said test chamber such that said first gas is injected into said test chamber;
a first pressure regulator for controlling a pressure of said first gas;
a mass spectrometer adapted to sample and detect gas from an interior of said unit to determine if said first gas has leaked into said unit;
a supply of a second gas coupled to a port in said unit such that said second gas is injected into an interior of said unit to replace said sampled gas; and
a second pressure regulator for controlling a pressure of said second gas such that a pressure in said interior of said unit remains constant.

28. A system for detecting leaks in a unit comprising:
a test chamber within which said unit is contained;
a supply of a first gas coupled to a port in said unit such that said first gas is injected into an interior of said unit;
a first pressure regulator for controlling a pressure of said first gas;
a mass spectrometer adapted to sample and detect gas from said test chamber to determine if said first gas has leaked out of said unit;
a supply of a second gas coupled to a port in said test chamber such that said second gas is injected into said test chamber to replace said sampled gas; and
a second pressure regulator for controlling a pressure of said second gas such that a pressure in said test chamber remains constant.

29. A method for detecting leaks in a unit including the steps of:
injecting a first gas around an exterior of said unit;
sampling gas from an interior of said unit to determine if said first gas has leaked into said unit; and
maintaining a constant differential pressure between said interior and exterior of said unit during said sampling.

30. The invention of claim 29 wherein said method includes replacing said sampled gas from said interior of said unit with a second gas such that a pressure in said interior remains constant.

31. The invention of claim 30 wherein said method further includes controlling a pressure of said first gas to control a pressure of said exterior of said unit.

32. A method for detecting leaks in a unit including the steps of:
injecting a first gas into an interior of said unit;
sampling gas from an exterior of said unit to determine if said first gas has leaked out of said unit; and
maintaining a constant differential pressure between said interior and exterior of said unit during said sampling.

33. The invention of claim 32 wherein said method includes replacing said sampled gas from said exterior of said unit with a second gas such that a pressure in said exterior remains constant.

34. The invention of claim 33 wherein said method further includes controlling a pressure of said first gas to control a pressure in said interior of said unit.

* * * * *